US008618213B2

(12) United States Patent
Flosbach et al.

(10) Patent No.: US 8,618,213 B2
(45) Date of Patent: Dec. 31, 2013

(54) LIQUID TWO-COMPONENT COATING COMPOSITIONS

(75) Inventors: Carmen Flosbach, Wuppertal (DE); Engin Temeltas, Wuppertal (DE); Katharina Dreger, Dusseldorf (DE)

(73) Assignee: Axalta Coating Systems IP Co., LLC, Wilmington, DE (US)

( * ) Notice: Subject to any disclaimer, the term of this patent is extended or adjusted under 35 U.S.C. 154(b) by 154 days.

(21) Appl. No.: 13/121,199

(22) PCT Filed: Sep. 28, 2009

(86) PCT No.: PCT/US2009/058574

§ 371 (c)(1), (2), (4) Date: Apr. 4, 2011

(65) Prior Publication Data

US 2011/0237742 A1 Sep. 29, 2011

Related U.S. Application Data

(60) Provisional application No. 61/194,582, filed on Sep. 29, 2008.

(51) Int. Cl.
*C08L 75/00* (2006.01)
*B05D 3/02* (2006.01)

(52) U.S. Cl.
USPC .................................... 524/590; 427/385.5

(58) Field of Classification Search
USPC .................................... 524/590; 427/385.5
See application file for complete search history.

(56) References Cited

U.S. PATENT DOCUMENTS 4,041,019 A * 8/1977 McGraw et al. ................ 528/53
5,569,733 A * 10/1996 Donnelly et al. ............... 528/61
6,737,163 B2 * 5/2004 Chasser et al. ................ 428/418

OTHER PUBLICATIONS

MSDS of D.E.R. 736 of Dow chemical , 2009.*

* cited by examiner

*Primary Examiner* — Aiqun Li
(74) *Attorney, Agent, or Firm* — Ingrassia Fisher & Lorenz, P.C.

(57) ABSTRACT

The invention relates to two-component liquid coating composition comprising:

A) at least one compound with functional groups reactive towards reactive functional groups of cross-linking agent B),
B) at least one cross-linking agent with reactive functional groups and
C) at least one catalyst compound having at least one urethane and/or at least one urea group and at least one tertiary amine group, said catalyst compound is present as particles having a melting temperature of 40 to 180° C.

16 Claims, No Drawings

LIQUID TWO-COMPONENT COATING COMPOSITIONS

CROSS-REFERENCE TO RELATED APPLICATION

This application is a U.S. National-Stage entry under 35 U.S.C. § 371 based on International Application No. PCT/US2009/58574, filed Sep. 28, 2009 which was published under PCT Article 21(2) and which claims priority to U.S. Provisional Application No. 61/194,582, filed Sep. 29, 2008, which are all hereby incorporated in their entirety by reference.

FIELD OF THE INVENTION

The invention relates to liquid two-component coating compositions which contain cross-linkable binders, cross-linking agents and a latent catalyst for the curing reaction.

DESCRIPTION OF THE PRIOR ART

The use of two-component coating compositions based on a hydroxy-functional binder component and a polyisocyanate cross-linking agent is widespread in vehicle coating, in particular also in vehicle repair coating, due to the very good technological properties of these coating compositions. The coating compositions are here used both in water-based and in solvent-based form.

In particular for use in vehicle repair coating, a short drying time of the coating at moderate temperatures, for example from room temperature up to approx. 60° C., is desired. Drying or curing time may be markedly reduced by using catalysts for the cross-linking reaction. However, using catalysts also simultaneously leads to a reduction in pot life, i.e. a reduction in the time within which the coating composition can still satisfactorily be processed or applied.

Various approaches to solving this problem are already known.

For example, it has been proposed not to introduce the catalyst for the reaction between polyisocyanates and binders with groups reactive towards polyisocyanates into the two-component coating composition or the actual coating layer produced therefrom, but instead into another coating layer located thereunder or thereover. U.S. Pat. No. 5,578,345 and WO 2007/068683, for example, describe to this end multi-layer coating methods wherein a clear coat based on a polyisocyanate cross-linking agent and a hydroxy- and/or mercapto-functional binder is applied in the multilayer structure onto a base coat which contains a catalyst for the cross-linking reaction in the clear coat. After application of the clear coat, the catalyst is here intended to migrate across the boundary layer between the two coatings into the clear coat and catalyse the cross-linking reaction therein. Since the two-component coating material does not itself contain a catalyst, satisfactory pot lives are achieved. One disadvantage of this method is, however, that it may be difficult to control the targeted migration of the catalyst into the coating layer to be cross-linked, for example the clear coat layer. As a result, excessive or inadequate catalysis may easily occur, which may result, for example, in insufficiently complete curing or an unsatisfactorily long drying time.

It is furthermore known from WO 01/92362 to use photolatent catalysts, for example amines, in coating compositions based on a polyisocyanate cross-linking agent and a mercapto-functional binder. In the coating composition itself, the photolatent catalyst is inactive and is only activated after application by irradiation with high-energy radiation. An extended pot life may also be achieved in this manner. However, additional UV lamp equipment is required for this purpose and sensitisers, such as thioxanthones or benzophenones, must be used in addition to the photolatent catalysts. Moreover, rapid drying cannot be achieved in areas which are not reached by UV radiation.

There is accordingly still a requirement for two-component coating compositions, in particular based on a binder component reactive with polyisocyanates and a polyisocyanate cross-linking agent, which combine an adequate working time with a short drying time even at moderate temperatures of for example 40 to 60° C. The coating compositions should here yield coatings with very good technological properties, such as for example very good hardness and resistance to chemicals and water, and unblemished optical appearance.

SUMMARY OF THE INVENTION

This invention relates to two-component coating compositions which contain cross-linkable binders, cross-linking agents and a latent catalyst for the curing reaction.

The invention is therefore directed to coating compositions comprising:

A) at least one compound with functional groups reactive towards functional groups of cross-linking agent B), preferably at least one compound with functional groups reactive towards isocyanate groups, B) at least one cross-linking agent, preferably at least one cross-linking agent with free isocyanate groups and C) at least one catalyst compound for the curing reaction between the functional groups of component A and the functional groups of component B, said catalyst compound has at least one urethane and/or urea group and at least one tertiary amine group and is present as particles having a melting temperature of 40 to 180° C., in particular, 60 to 140° C.

It has been found that the coating compositions based on components A), B) and C) have improved pot-life of, for example, 60 minutes to 20 hours, while retaining short drying times of, for example, 5-30 minutes at 40-80° C.

DETAILED DESCRIPTION OF THE EMBODIMENTS

These and other features and advantages of the present invention will be more readily understood, by those of ordinary skill in the art, from a reading of the following detailed description. It is to be appreciated those certain feature of the invention, which are, for clarity, described above and below in the context of separate embodiments, may also be provided in combination in a single embodiment. Conversely, various feature of the invention that are, for brevity, described in the context of a single embodiment, may also be provided separately or in any sub-combination. In addition, references in the singular may also include the plural (for example, “a” and “an” may refer to one, or one or more) unless the context specifically states otherwise.

The use of numerical values in the various ranges specified in this application, unless expressly indicated otherwise, are stated as approximations as though the minimum and maximum values within the stated ranges were both preceded by the word “about”. In this manner slight variations above and below the stated ranges can be used to achieve substantially the same results as value within the ranges. Also, the disclosure of these ranges is intended as continuous range including every value between the minimum and maximum values, including the minimum and maximum end points of the range.

The term (meth)acrylic as used here and hereinafter should be taken to mean methacrylic and/or acrylic.

Unless stated otherwise, all the molar mass data, number-average molar mass data Mn or weight-average molar mass data Mw stated in the present description are molar masses determined or to be determined by gel permeation chromatography (GPC; divinylbenzene-crosslinked polystyrene as the immobile phase, tetrahydrofuran as the liquid phase, polystyrene standards).

The phrase "groups reactive towards isocyanate groups" used in the present invention in particular means groups capable of addition reaction with isocyanate groups.

The coating compositions according to the invention are liquid coating compositions comprising binders, cross-linkers and a liquid carrier. The liquid carrier may be water and/or one or more organic solvents. Therefore, the coating compositions may be water-based or organic solvent-based.

Water-based coating compositions are coating compositions, wherein water is used as solvent or thinner when preparing and/or applying the coating composition. Usually, aqueous coating compositions contain 20 to 80% by weight of water, based on the total amount of the coating composition and optionally, up to 15% by weight, preferably, below 10% by weight of organic solvents, based on the total amount of the coating composition.

Organic solvent-based coating compositions are coating compositions, wherein organic solvents are used as solvent or thinner when preparing and/or applying the coating composition. Usually, organic solvent-based coating compositions contain 20 to 80% by weight of organic solvents, based on the total amount of the coating composition.

The pot life is the time within which, once the mutually reactive components of a coating composition have been mixed, the coating composition may still be properly processed or applied and coatings of unimpaired quality can be achieved.

The coating compositions according to the invention are two-component coating compositions. The handling of two-component coating compositions generally requires mixing together the reactive components shortly before application to avoid premature reaction of the reactive components. The term "shortly before application" is well-known to a person skilled in the art working with two-component coating compositions. The time period within which the ready-to-use coating composition may be prepared prior to the actual use/application depends, e.g., on the pot life of the coating composition.

The coating compositions according to the invention contain the components A), B) and C).

Components A) and B) which are reactive with each other shall be stored separately and mixed together only shortly before application. Component C) can be either part of component A) and/or B) or a separate component.

Preferably component C) is part of component A).

Usually the coating compositions of the present invention comprise 40-80% by weight solids, preferably 50-70% by weight solids of the at least one component A) and 20-40% by weight solids, preferably 20-30% by weight solids of the at least one cross-linking agent B), relative to the entire coating composition.

The coating compositions of the present invention preferably comprise the at least one catalyst compound C) in amounts of 0.2 to 10% by weight, more preferred of 0.5-5% by weight relative to the entire coating composition.

Component A) of the coating composition according to the invention comprises monomeric, oligomeric or polymeric compounds with functional groups reactive towards functional groups of cross-linking agent B). These compounds can be compounds with low molar mass in the range of 200 to 600 or oligomeric or polymeric binders. The binders are compounds with a number average molar mass (Mn) of, e.g., 500 to 500,000 g/mole, preferably of 1100 to 300,000 g/mole. The functional groups may be for example groups with active hydrogen, epoxy, silane groups or additional functional groups that can be cured under catalysis of base catalyst compound C).

Corresponding cross-linking agents B) can be for example compounds with isocyanate groups in the case of compounds A with active hydrogen groups, with carboxyl groups in the case of compounds A with epoxy groups. In case of silane functional compounds A) hydroxyl functional compounds B) can be used as well as water may be considered as cross-linking component B). Also, additional cross-linking component B) may be used that are able to react with the functional groups of compounds A) and that can be catalyzed with base catalyst compound C).

Examples of useful components A) are described in the following.

Components A) with epoxy groups are for example, liquid, and/or are soluble in an organic solvent (mixture). Epoxy-functional component(s) A soluble in an organic solvent (mixture) are present in dissolved form in the coating compositions containing organic solvent(s). The epoxy-functional components A comprise compounds having at least two epoxy groups per molecule and a calculated epoxy equivalent weight of, for example, 200 to 700, preferably of 250 to 500 and in particular of 300 to 400.

Examples of epoxy-functional components A are conventional di- or polyepoxides, for example, polyglycidyl ethers based on diethylene glycol, dipropylene glycol, polypropylene glycol, bisphenol A or triglycidyl ethers of glycerol. Further examples of di- or polyepoxides are those based on di- or polyglycidyl esters. Examples of these are reaction products prepared from 1-hydroxy-2,3-epoxypropane with phthalic or terephthalic acid to form phthalic or terephthalic acid bis(2,3-epoxypropyl ester) or a diglycidyl ether of bisphenol A with trimellitic anhydride to form polyesters, for example having a number average molar mass of 500 to 2000.

Preferred epoxy-functional components A are conventional epoxy-functional (meth)acrylic copolymers with a branched or unbranched molecular structure, in particular glycidyl(meth)acrylate copolymers. Such epoxy-functional (meth)acrylic copolymers are, for example, stated in greater detail as preferred components B1) in U.S. Pat. No. 6,555,176 B1 and as components B) in U.S. Pat. No. 6,743,867 B1.

Components A) with silane groups are, for example, silane functional (meth)acrylic copolymers, silane functionalized urethanes or polyesters known to the skilled person, which are used in the formulation of organic solvent based or aqueous coating compositions. They may each be used individually or in combination with one another. Preferred binders are silane functional copolymers synthesized via copolymerization of silane functional monomers like vinyltrimethoxysilane, vinyltriethoxysilane, optionally in combination with other polymerizable unsaturated monomers, preferably in combination with (meth)acrylic monomers.

Silane functional polyurethanes may be produced, for example, by the reaction of amino silanes with NCO-functional prepolymers.

Cross-linking agents B with carboxyl groups are, for example, liquid, and/or they are soluble in organic solvent (mixture). Carboxyl-functional cross-linking agents B soluble in organic solvent (mixture) are present in dissolved form in the coating compositions containing organic solvent(s). The carboxyl-functional cross-linking agents B comprise compounds with at least two carboxyl groups per molecule, such as, polycarboxylic acids, for example, dimer fatty acids; carboxyl-functional oligomers or polymers, for example, corresponding polyethers, polyesters, (meth) acrylic copolymers or polymers with carboxyl groups linked to the polymer by half ester moieties produced by reaction of polyether polyols, polyester polyols, polyurethane polyols or hydroxyl-functional (meth)acrylic copolymers with cyclic carboxylic anhydride. Carboxyl-functional cross-linking agents B which are in particular suitable are carboxyl-functional (meth)acrylic copolymers and carboxyl-functional polyesters in each case with acid values originating from the carboxyl groups of 15 to 300 mg of KOH/g, as are, for example, described as carboxyl-functional components A) in U.S. Pat. No. 6,555,176 B1 and in U.S. Pat. No. 6,743,867 B1.

Preferred coating compositions comprise at least one compound A with functional groups reactive towards isocyanate groups and at least one cross-linking agent B with free isocyanate groups. Functional groups reactive towards isocyanate groups are groups with active hydrogen.

The functional groups with active hydrogen may be for example hydroxyl groups, thiol groups, primary and/or secondary amino groups or combinations thereof. Compounds with hydroxyl groups and/or thiol groups are preferably used as component A).

The binders with hydroxyl groups are for example the polyurethanes, (meth)acrylic copolymers, polyesters and polyethers, known from polyurethane chemistry to the skilled person, which are used in the formulation of organic solvent based or aqueous coating compositions. They may each be used individually or in combination with one another.

Examples of suitable polyurethane resins include all polyurethane resins which are suited for solvent based or aqueous coatings and known to a skilled person. Examples are polyurethane resins, for example, with a number average molar mass Mn of 500 to 500 000 g/mol, preferably, of 1100 to 300 000 g/mol, most preferably, of 5000 to 300 000 g/mol, an acid value of 0 to 100 mg KOH/g, preferably of 20 to 80 mg KOH/g, and a hydroxyl value of 40 to 400 mg KOH/g, preferably, of 80 to 250 mg KOH/g. Appropriate polyurethane resins which may be used are, for example, prepared by reacting compounds which are reactive with respect to isocyanate groups and polyisocyanates having at least 2 free isocyanate groups per molecule.

Polyols of high molecular weight can be used as compounds which are reactive with respect to isocyanate groups, preferably, polyester polyols, polyether polyols and/or polycarbonate polyols with a molecular weight of, for example, 500-6000 g/mol. Polyols of low molecular weight with a molecular weight of 60-400 g/mol can also be co-used. Aliphatic and/or cycloaliphatic diisocyanates can preferably be used as polyisocyanates. Examples of useful polyisocyanates are phenylene diisocyanate, xylylene diisocyanate, diphenylmethane diisocyanate, isophorone diisocyanate, dicyclohexylmethane diisocyanate, tetramethylene diisocyanate, hexamethylene diisocyanate.

The thus obtained polyurethane resins can still be subjected to chain extension to increase the molar mass. For example, NCO-functional polyurethane prepolymers can be reacted with compounds, which are reactive with respect to isocyanate groups. Compounds, which are reactive with respect to isocyanate groups, are in particular compounds with hydroxyl and/or secondary and/or primary amino groups. OH-functional polyurethane prepolymers can be chain extended for example with polyisocyanates The polyurethane resins include such resins which are in modified form, for example, as silicon-modified or (meth) acrylated polyurethane resins. Examples of polyurethane resins which may be used are described in U.S. Pat. No. 5,492,961, U.S. Pat. No. 5,141,987, U.S. Pat. No. 5,556,912, DE-A-41 15 042, U.S. Pat. No. 5,635,559, U.S. Pat. No. 5,691,425, DE-A-42 28 510, U.S. Pat. No. 5,854,337 and U.S. Pat. No. 4,489,135.

Examples of hydroxyl-functional poly(meth)acrylate resins include all poly(meth)acrylate resins which are suited for solvent based or aqueous coatings and known to a skilled person. For example, they can be those with a number average molar mass Mn of 1000-20000 g/mol, preferably, of 1100-15000, an acid value of 0-100 mg KOH/g, preferably, of 15-50 and a hydroxyl value of 40-400 mg KOH/g, preferably, of 60-200 mg KOH/g. The water-dilutable poly(meth)acrylate resins can also have been prepared in the presence of different binders, e.g., in the presence of oligomeric or polymeric polyester and/or polyurethane resins.

The poly(meth)acrylate copolymer can be prepared by free-radical polymerization of polymerizable, olefinically unsaturated monomers, optionally, in presence of oligomeric or polymeric polyester and/or polyurethane resins. Free-radically polymerizable, olefinically unsaturated monomers, which may be used are monomers which, in addition to at least one olefinic double bond, also contain further functional groups and monomers which, apart from at least one olefinic double bond, contain no further functional groups. Further functional groups may be, for example, urea, hydroxyl, carboxyl, sulfonic acid, silane, amine, amide, acetoacetate or epoxy groups. It would be clear that only those functional groups can be combined in the poly(meth)acrylate copolymer which do not tend to self-crosslink.

Olefinically unsaturated monomers with hydroxyl groups are used to introduce hydroxyl groups into the (meth)acrylic copolymers. Suitable hydroxy-functional unsaturated monomers are, for example, hydroxyalkyl esters of alpha, beta-olefinically unsaturated monocarboxylic acids with primary or secondary hydroxyl groups. These may, for example, comprise the hydroxyalkyl esters of acrylic acid, methacrylic acid, crotonic acid and/or isocrotonic acid. The hydroxyalkyl esters of (meth)acrylic acid are preferred. Further olefinically unsaturated monomers with hydroxyl groups may, of course, also be used.

Carboxyl functional olefinically unsaturated monomers are used to introduce carboxyl groups into the (meth)acrylic copolymers. Examples of suitable olefinically unsaturated carboxylic acids include acrylic acid, methacrylic acid, crotonic acid and isocrotonic acid, itaconic acid, maleic acid, fumaric acid and the halfesters of the difunctional acids. Acrylic and methacrylic acid are preferred.

Unsaturated monomers which, apart from at least one olefinic double bond, contain no further functional groups are, for example, aliphatic esters of olefinically unsaturated carboxylic acids, such as (meth)acrylic acid, vinyl esters and/or vinylaromatic hydrocarbons such as styrene.

Also, other additional unsaturated monomers, which contain apart from an olefinic double bond further functional groups can be used.

Examples of polyester resins which can be used as binder component A) include all polyester resins which are suited for organic solvent based or aqueous coatings, for example, hydroxyfunctional polyesters with a number average molar mass of 500-10,000 g/mol, preferably, of 1100-8000 g/mol, an acid value of 0-150 mg KOH/g, preferably, of 15-50 mg KOH/g and a hydroxyl value of 40-400 mg KOH/g, preferably, of 50-200 mg KOH/g. The polyesters may be saturated or unsaturated and they may optionally be modified with fatty acids. The polyesters are produced using known processes with elimination of water from polycarboxylic acids and polyalcohols.

Thiol-functional compounds A) that can suitably be used in the coating composition according to the invention include dodecyl mercaptan, mercapto ethanol, 1,3-propanedithiol, 1,6-hexanedithiol, methylthioglycolate, 2-mercaptoacetic acid, mercaptosuccinic acid, and cysteine. Also suitable are esters of a thiol-functional carboxylic acid with a polyol, such as esters of 2-mercaptoacetic acid, 3-mercaptopropionic acid, 2-mercapto-propionic acid, 11-mercaptoundecanoic acid, and mercaptosuccinic acid. Examples of such esters include pentaerythritol tetrakis(3-mercaptopropionate), pentaerythritol tetrakis(2-mercaptoacetate), trimethylol propane tris(3-mercaptopropionate), trimethylol propane tris(2-mercaptopropionate), and trimethylol propane tris(2-mercaptoacetate). A further example of such a compound consists of a hyperbranched polyol core based on a starter polyol, e.g. trimethylol propane and dimethylol propionic acid, which is subsequently esterified with 3-mercaptopropionic acid and isononanoic acid. These compounds are described for example in EP 0 448 224.

Addition of $H_2S$ to epoxy-functional compounds also results in thiol-functional compounds. These compounds may have a structure of the following formula T[(O—CHR—CH2-O)nCH2CHXHCH2YH]m, with T being a m valent organic moiety wherein m is an integer between 1 and 25, R being hydrogen or methyl, n being an integer between 0 and 30, X and Y being oxygen or sulfur, with the proviso that X and Y are not equal. Other syntheses to prepare compounds comprising thiol-functional groups involve: the reaction of an aryl or alkyl halide with NaHS to introduce a pendant mercapto group into the alkyl and aryl compounds, respectively; the reaction of a Grignard reagent with sulfur to introduce a pendant mercapto group into the structure; the reaction of a polymercaptan with a polyolefin according to a nucleophilic reaction, an electrophilic reaction or a radical reaction; the reaction of disulfides.

In another embodiment the thiol group of the thiol-functional compound A) can be covalently attached to a resin. Such resins include thiol-functional polyurethane resins, thiol-functional polyester resins, thiol-functional polyaddition polymer resins, thiol-functional polyether resins, thiol-functional polyamide resins, thiol-functional polyurea resins, and mixtures thereof. Thiol-functional resins can be prepared by the reaction of $H_2S$ with an epoxy group or an unsaturated carbon-carbon bond-containing resin, the reaction between a hydroxyl-functional resin and a thiol-functional acid, and by the reaction of an isocyanate-functional polymer and either a thiol-functional alcohol or a di- or polymercapto compound.

A thiol-functional polyurethane resin can be the reaction product of a mono-, di-, tri- or tetrafunctional thiol compound with an isocyanate-terminated polyurethane and preferably is the reaction product of a diisocyanate compound and (a) diol-functional compound(s). Suitable thiol-functional polyurethane resins are obtainable by first preparing an isocyanate-functional polyurethane from diols, diisocyanates, and optionally building blocks containing groups which facilitate the stabilization of the resin in an aqueous dispersion, followed by reaction of the isocyanate-functional polyurethane with a polyfunctional thiol in a base-catalyzed addition reaction.

The thiol-functional resin can also be a polyester prepared from (a) at least one polycarboxylic acid or reactive derivatives thereof, (b) at least one polyol, and (c) at least one thiol-functional carboxylic acid. The polyesters preferably possess a branched structure. Branched polyesters are conventionally obtained through condensation of polycarboxylic acids or reactive derivatives thereof, such as the corresponding anhydrides or lower alkyl esters, with polyalcohols, when at least one of the reactants has a functionality of at least 3.

The thiol-functional resin can also be a thiol-functional polyaddition polymer, for example a poly(meth)acrylate. Such a poly(meth)acrylate is derived from hydroxyl-functional (meth)acrylic monomers, such as hydroxyethyl(meth) acrylate, hydroxypropyl(meth)acrylate, hydroxybutyl(meth) acrylate, and other ethylenically unsaturated polymerizable monomers as described above for the polyaddition polymer preparation.

The thiol group is introduced by esterification of (part of) the hydroxyl groups of the acrylate copolymer with one or more of the thiol-functional carboxylic acids described above. Alternatively, glycidyl methacrylate is introduced into the polymer to prepare an epoxy-functional poly(meth)acrylate. The epoxy groups are then reacted with suitable thiol-functional carboxylic acids such as mentioned above.

Examples of suitable thiol functional compounds are described in WO 2006/064035 and WO 2005/123862.

In particular pentaerythritol tetrakis(3-mercapto propionate) and trimethylolpropane tris(3-mercaptopropionate) can be used as thiol-functional compounds.

In order to ensure sufficient water dilutability of the binders A) in case of aqueous coating compositions, these binders are modified in a suitable manner to render them hydrophilic. The binders A) may be ionically (anionically and/or cationically) and/or non-ionically modified. An anionic modification and an anionic modification in combination with a non-ionic modification is preferred. Preferably, water-dilutable binders A) may contain carboxylic acid groups, sulfonic and/or phosphonic acid groups. Carboxylic acid groups are most preferred. Also, emulsifiers can be used, alone or in addition to a hydrophilic modification of the binders A).

The compounds A) can be used individually or in combination.

Component A) of the coating compositions according to the invention can also contain reactive monomers of low molecular weight, so-called reactive thinners, which are able to act as a solvent and can react with the cross-linking components. Examples of those compounds are hydroxy-, thiol- or amino-functional reactive thinners.

The coating compositions, according to the invention preferably contain polyisocyanates with free isocyanate groups as cross-linking agents (component B). Examples of the polyisocyanates are any number of organic polyisocyanates with aliphatically, cycloaliphatically, araliphatically and/or aromatically bound free isocyanate groups. The polyisocyanates are liquid at room temperature or become liquid through the addition of organic solvents. At 23° C., the polyisocyanates generally have a viscosity of 1 to 6,000 mPas, preferably, above 5 and below 3,000 mPas.

The preferred polyisocyanates are polyisocyanates or polyisocyanate mixtures with exclusively aliphatically and/or cycloaliphatically bound isocyanate groups with an average NCO functionality of 1.5 to 5, preferably 2 to 4.

Examples of particularly suitable polyisocyanates are what are known as "paint polyisocyanates" based on hexamethylene diisocyanate (HDI), 1-isocyanato-3,3,5-trimethyl-5-isocyanatomethyl-cyclohexane (IPDI) and/or bis(isocyanatocyclohexyl)-methane and the derivatives known per se, containing biuret, allophanate, urethane and/or isocyanurate groups of these diisocyanates which, following production, are freed from surplus parent diisocyanate, preferably by distillation, with only a residue content of less than 0.5% by weight. Triisocyanates, such as, triisocyanatononan can also be used.

Sterically hindered polyisocyanates are also suitable. Examples of these are 1,1,6,6-tetramethyl-hexamethylene diisocyanate, 1,5-dibutyl-penta-methyldiisocyanate, p- or m-tetramethylxylylene diisocyanate and the appropriate hydrated homologues.

In principle, diisocyanates can be converted by the usual method to higher functional compounds, for example, by trimerization or by reaction with water or polyols, such as, for example, trimethylolpropane or glycerine. The polyisocyanates can also be used in the form of isocyanate-modified resins.

The polyisocyanate cross-linking agents can be used individually or in combination.

The polyisocyanate cross-linking agents are those commonly used in the paint industry, and are described in detail in the literature and are also obtainable commercially.

The catalyst compounds C) are compounds with at least one urethane and/or at least one urea group, preferably with at least two urethane and/or at least two urea groups or with at least one urethane and at least one urea group, and with at least one tertiary amine group, for example with one to three tertiary amine groups. The catalyst compounds are present in the coating compositions according to the invention as particles, in particular with a non-spherical shape, and have a melting temperature of 40 to 180° C., in particular 60 to 140° C. The melting temperatures may be sharp melting points, but in general they are not sharp melting points, but instead the upper end of melting ranges with a breadth of, for example, 30 to 150° C., i.e. the breadth between the starting temperature and the end temperature of the melting process can be 30 to 150° C. The melting ranges and thus the melting temperatures are determined by DSC (differential scanning calorimetry) at heating rates of 10 K/min, wherein according to this invention the melting temperature of a compound C) is the end temperature of the measured DSC curve. According to DIN 53765 (March 1994) the end temperature of a measured DSC curve is the end temperature $T_{SE}$. ($T_{SE}$ is the temperature of the last detectable deviation from the base line.)

The catalyst compounds C) are insoluble or virtually insoluble in the coating compositions and are present therein as particles. The catalyst compounds C) are only very slightly, if at all, soluble in organic solvents conventional in coatings, the solubility amounting, for example, to less than 10, in particular less than 5 g per litre of butyl acetate at 20° C.

The catalysts compounds C) with at least one tertiary amine group have amine contents of, for example, 20 to 400, preferably 40 to 300 (calculated as mg KOH/g resin solids). The catalysts compounds C) are free of acid groups.

The catalyst compounds C) can be compounds in the form of low molar mass compounds defined by empirical and structural formula. They may have, for example, a molar mass of 288 to 800. But catalyst compounds C) can also be oligomeric and/or polymeric compounds with a molar mass distribution, for example, with a number average molar mass of 800 to 5000, preferably of 1000 to 3000.

Methods for the production of the catalyst compounds with at least one urethane and/or urea group and at least one tertiary amine group are known to the person skilled in the art. Generally they may be produced by reacting a) polyisocyanate(s), in particular diisocyanate(s) with b) polyol(s) and/or with c) at least one tertiary amine compound c) having at least one group capable of addition with isocyanate.

The tertiary amine compound c) is a compound containing at least one tertiary amine group and at least one group containing active hydrogen atoms. The tertiary amine compound c) can be for example a hydroxyl amine with a tertiary amino group or a polyamine, in particular a diamine with at least one tertiary amino group and a secondary or primary amino group. Dialkylhydrazines may also be used as tertiary amine compound c). The tertiary amine compound c) can also be a thiol amine with at least one tertiary amino group. The tertiary amine compound c) can also be a polyamine with at least one tertiary amino group and at least two groups containing active hydrogen atoms, e.g. with two secondary and/or primary amino groups.

Polyols b) can be replaced at least partly by polyols with a tertiary amino group. In those cases the polyols, in particular diols, with the tertiary amino group can be used in combination with the tertiary amine c) in order to introduce tertiary amino groups into the catalyst compound C. However, catalyst compound C may also be prepared without the tertiary amine c).

Also, the polyols b) can generally be used in excess to prepare catalyst compounds C) containing in addition hydroxyl groups. It is also possible, even if not preferred, to use the polyisocyanates a) in excess to prepare compounds C) containing in addition free isocyanate groups. This would allow to incorporate the functionalized catalyst into the binder/cross-linking agent matrix of the final coating.

By reacting a) polyisocyanate(s), with b) polyol(s) and/or with c) at least one tertiary amine compound c) urethane and/or urea groups and optionally thiourethane groups are formed in the final compound C).

Preparation of Catalyst Compounds C can be Carried Out in Different Ways.

I) According to one embodiment polyisocyanate a) is reacted with polyol b) and with the tertiary amine compound c).

According to one possible way polyisocyanate a) can be reacted first with polyol b) to form an isocyanate-functional urethane compound. The isocyanate-functional urethane compound can then be reacted with the tertiary amine c) to form the catalyst compound C). The equivalent ratio of isocyanate groups of the intermediate isocyanate-functional urethane compound to the active hydrogen of the tertiary amine c) may be in the range of 2:1 to 0.9:1, preferably in the range of 1:1.

According to a second possible way polyol b) and tertiary amine c) can be present first and polyisocyanate a) can then be added to the mixture. The equivalent ratio of active hydrogen of polyol b) and tertiary amine c) to isocyanate groups of polyisocyanate a) may be in the range of 2:1 to 0.5:1, preferably in the range of 2:1 to 1:1.

In the case that tertiary amine compounds with at least two groups with active hydrogen atoms are used as compound c) it is possible to react first the polyisocyanate a) with the tertiary amine compound c) to form an isocyanate functional prepolymer and to react then further with a polyol b) to introduce hydroxyl functionality. The ratio of isocyanate groups to active hydrogen groups from tertiary amin c) and polyol b) may be in the range of 1:2 to 2:1 preferably 1:1.1 to 1.5:1

Furthermore, it is possible to replace part of the polyol b) with a monoalcohol as a chainstopper. This is preferably done when tertiary amines with two groups with active hydrogen atoms are used as compounds c). Examples for such monoalcohols are methanol, ethanol, propanol, isopropanol, butanol, isobutanol, tert-butanol, cyclohexanol and benzylalcohol.

It is also possible to react polyisocyanates a) with a tertiary amine compound with at least two groups with active hydrogen atoms without the further use of polyols b).

II) Therefore, according to a further embodiment catalyst compounds C) can be prepared by reacting polyisocyanates a) with a tertiary amine compound c) with at least two groups with active hydrogen atoms.

If polyols/diols b) having at least on tertiary amino group are used to introduce the tertiary amino group into the catalyst compound C the use of tertiary amines c) is not required.

III) Therefore, according to a further embodiment catalyst compounds C) can be prepared by reacting polyisocyanates a) with polyols/diols b) having at least on tertiary amino group.

Polyisocyanates a), polyols b) and tertiary amine compounds c) suitable for the preparation of the catalyst compound C) are preferably compounds defined by empirical and structural formula. But also, for example, oligomeric or polymeric polyols b) with number-average molar masses of, for example, up to 800, for example, corresponding hydroxyl-functional polyethers, polyesters or polycarbonates can be used. Low molar mass polyols defined by an empirical and structural formula are, however, preferred.

Polyisocyanates a) suitable for the preparation of the catalyst compound C) may be monomeric diisocyanates or the well-known dimers or trimers of monomeric diisocyanates. Examples of polyisocyantes are 1,6-hexane diisocyanate, toluylene diisocyanate, diphenylmethane diisocyanate, dicyclohexylmethane diisocyanate, isophorone diisocyanate, trimethylhexane diisocyanate, cyclohexane diisocyanate, cyclohexanedimethylene diisocyanate and tetramethylenexylylene diisocyanate and the corresponding dimmers and trimers. Preferred polyisocyanates comprise polyisocyanates selected from a group consisting of 1,6-hexane diisocyanate, diphenylmethane diisocyanate, the isocyanurate of 1,6-hexane, diisocyanate, the isocyanurate of diphenylmethane diisocyanate, and combinations thereof. These preferred polyisocyanates can be used in combination with additional polyisocyanates.

Polyols b) suitable for the preparation of the catalyst compound C) are, for example, diols with a molar mass in the range of 62 to 600. In the case of a diol combination each of the diols preferably constitutes at least 10 mol % of the diols of the diol component. In the case of a diol combination, it is preferred, that at least 70 mol %, in particular, 100 mol % of the diols are (cyclo)aliphatic diols, each with a molar mass in the range of 62 to 600.

Examples of suitable polyols are in particular diols such as ethylene glycol, the isomeric propane and butanediols, 1,5-pentanediol, 1,6-hexanediol, 1,10-decanediol, 1,12-dodecanediol, 1,4-cyclohexandimethanol, bisphenol A, hydrogenated bisphenol A. Minor amounts of diols like neopentylglykol, 1,2-propanediol, 1,2- or 1,3-butanediol, butylethyl propanediol can be used in mixture. Also polyols/diols b) having at least on tertiary amino group can be used. Examples of those polyols/diols are N-methyldiethanolamine, N-methyldimethanolamine, N-methyldipropanolamine, N-methyldiisopropanolamine, N-ethyldimethanolamine, N-ethyldiethanolamine and triethanolamine.

Preferred diols are linear aliphatic alpha,omega-C2-C12-diols. Those diols can be combined with 0 to 80 mol % by at least one diol that is different from linear aliphatic alpha, omega-C2-C12-diols, wherein the mol % of the respective diols add up to 100 mol %. In particular preferred diols are 1,2- and 1,3-propanediol, 1,6-hexanediol, 1,10-decanediol and 1,12-dodecanediol.

Tertiary amines c) suitable for the preparation of the catalyst C) can be hydroxyl amines having at least one hydroxyl group and at least one tertiary amino group, polyamines, in particular diamines having a tertiary amino group and a secondary or primary amino group, thiol amines having at least one thiol group and at least one tertiary amino group and/or polyamines having at least two groups containing active hydrogen atoms.

Examples of hydroxyl functional amines are alkanol amines with at least one tertiary amine group, such as N,N-dimethylmethanolamine, N,N-dimethyldiethanolamine, N,N-dimethylaminopropanol, 2-hydroxymethylpyridine, 3-hydroxymethylpyridine, 4-hydroxymethylpyridine, 2-, 3- or 4-(α-hydroxyethyl)pyridine, 2-, 3- or 4-(α-hydroxypropyl)pyridine, 2-(hydroxymethyl)-4-methylpyridine, 2-(hydroxymethyl)-5-ethylpyridine, 2-(hydroxymethyl)-6-methylpyridine or the corresponding piperidine derivatives.

Examples of polyamines in particular diamines having a tertiary amino group and a secondary or primary amino group are N,N-dimethylamino ethylamine, diethylamino ethylamine, dipropylamino ethylamine, diisopropylamino ethylamien, dibutylamino ethylamine, disobutylamino ethylamine, dimethylamino propylamine, diethylamino propylamine, Dipropylamino propylamine, diisopropylamino propylamine, dibutylamino propylamine, disobutylamino propylamine, dimethylamino butylamine, diethylamino butylamine, dipropylamino butylamine, diisopropylamino butylamine, dibutylamino butylamine, disobutylamino butylamine, dimethylamino hexylamine, diethylamino hexylamine, dimethylamino isopropylamine, dimethylhydrazine and diethylhydrazine.

Examples of thiol amines having at least one thiol group and at least one tertiary amino group are N,N-diethyl-5-mercaptopentylamin, N,N-dimethyl-2,3-dimercaptopropylamin, N-(2-mercaptoethyl)-morpholin and N-benzyl-N-methyl-2-mercaptoethylamin.

Examples of tertiary amine compounds c) with at least two groups with active hydrogen atoms are tertiary amines with two hydroxyl groups and tertiary amines with two secondary or two primary amino groups. Examples of those tertiary amine compounds c) are N,N-dialkyldialkanolamines and N-alkyldialkanolamines, such as N,N-dimethyldiethanolamine and N-methyldiethanolamine, and alkyltriamines, such as alkyldipropylenetriamine. Alkyldipropylenetriamines are available, e.g. under the tradename Triameen® (Akzo).

Preferred tertiary amine compounds c) are N,N-dialkylalkanolamines, N,N-dialkyldialkanolamines and N-alkyldialkanolamines. Examples of those amines are N,N-dimethylalkanolamines, such as N,N-dimethylethanolamine, N,N-dimethylaminopropanol and N,N-dimethylmethanolamine, N,N-dimethyldialkanolamines, such as N,N-dimethyldiethanolamine, N,N-dimethyldimethanolamine as well as N-alkyldiethanolamines, such N-methyldiethanolamine.

The person skilled in the art selects the nature and proportion of the polyisocyanates, polyols and/or tertiary amines for the production of catalyst compounds C) in such a manner that catalyst compounds C) with the above-mentioned melting temperatures and the above-mentioned solubility behavior are obtained.

Polyisocyanates a) can be combined with any of the polyols b) and with any of the tertiary amine compounds c). Preferably those polyisocyanates a), those polyols b) and those tertiary amine compounds c) that have been disclosed above as preferred compounds are combined with each other.

In a first preferred embodiment, the catalyst compounds C) are compounds having at least one tertiary amino group which can be prepared by reacting 1,6-hexane diisocyanate and/or diphenylmethane diisocyanate with other suitable components. More preferred the catalyst compounds C) can be prepared by reacting 1,6-hexane diisocyanate and/or diphenylmethane diisocyanate with a diol component and a tertiary amine c) with at least one group with active hydrogen atoms. The diol component can be one single diol, in particular, one single (cyclo)aliphatic diol with a molar mass in the range of 62 to 600, or a combination of diols, preferably two to four, in particular, two or three diols, wherein in the case of a diol combination each of the diols preferably constitutes at least 10 mol % of the diols of the diol component. In the case of a diol combination, it is preferred, that at least 70 mol %, in particular, 100 mol % of the diols are (cyclo)aliphatic diols, each with a molar mass in the range of 62 to 600.

The term "(cyclo)aliphatic" used in the present invention encompasses cycloaliphatic, linear aliphatic, branched aliphatic and cycloaliphatic with aliphatic residues. Diols differing from (cyclo)aliphatic diols accordingly comprise aromatic or araliphatic diols with aromatically and/or aliphatically attached hydroxyl groups. One example is bisphenol A. Diols differing from (cyclo)aliphatic diols may furthermore comprise oligomeric or polymeric diols with number-average molar masses of, for example, up to 800, for example, corresponding polyether, polyester or polycarbonate diols.

In the case of the diol combination, the diol component may be introduced as a mixture of its constituent diols or the diols constituting the diol component may be introduced individually into the synthesis. It is also possible to introduce a proportion of the diols as a mixture and to introduce the remaining proportion(s) in the form of pure diol.

Examples of diols which are possible as one single diol of the diol component are ethylene glycol, the isomeric propane- and butanediols, 1,5-pentanediol, 1,6-hexanediol, 1,10-decanediol, 1,12-dodecanediol, 1,4-cyclohexanedimethanol, hydrogenated bisphenol A and dimer fatty alcohol.

Examples of diols which are possible as constituent of the diol component are telechelic(meth)acrylic polymer diols, polyester diols, polyether diols, polycarbonate diols, each with a number-average molar mass of, for example, up to 800 as representatives of oligomeric or polymeric diols, bisphenol A as a representative of low molar mass non-(cyclo)aliphatic diols defined by empirical and structural formula and ethylene glycol, the isomeric propane- and butanediols, 1,5-pentanediol, 1,6-hexanediol, 1,10-decanediol, 1,12-dodecanediol, neopentyl glycol, butylethylpropanediol, the isomeric cyclohexanediols, the isomeric cyclohexanedimethanols, hydrogenated bisphenol A, tricyclodecanedimethanol, and dimer fatty alcohol as representatives of (cyclo)aliphatic diols defined by empirical and structural formula with a low molar mass in the range of 62 to 600.

Preferred diols are 1,2- and 1,3-propanediol, 1,6-hexanediol, 1,10-decanediol and 1,12-dodecanediol.

1,6-hexane diisocyanate or diphenylmethane diisocyanate, the diol component and the tertiary amine are preferably reacted together in the absence of solvents. The reactants may here all be reacted together simultaneously or in two or more synthesis stages. When the synthesis is performed in multiple stages, the reactants may be added in the most varied order, for example, also in succession or in alternating manner. The diol component may, for example, be divided into two or more portions or into individual diols, for example, such that 1,6-hexane diisocyanate is initially reacted with part of the diol component before further reaction with the remaining proportion of the diol component. The individual reactants may in each case be added in their entirety or in two or more portions. The reaction is exothermic and proceeds at a temperature above the melting temperature of the reaction mixture. The reaction temperature is, for example, 60 to 200° C. The rate of addition or quantity of reactants added is accordingly determined on the basis of the degree of exothermy and the liquid (molten) reaction mixture may be maintained within the desired temperature range by heating or cooling.

Once the reaction carried out in the absence of solvent is complete and the reaction mixture has cooled, solid catalyst compounds C) are obtained. When low molar mass diols defined by empirical and structural formula are used for synthesis of the catalyst compound C), their calculated molar masses are in the range of 518 or above, for example, up to 2300.

In a second preferred embodiment, the catalyst compounds C) are compounds which can be prepared by reacting diisocyanate component a), diol component b) and a tertiary amine c), wherein 50 to 80 mol % of the diisocyanate component a) is formed by 1,6-hexane diisocyanate and/or diphenylmethane diisocyanate, and 20 to 50 mol % by one or two diisocyanates, each forming at least 10 mol % of the diisocyanate component and being selected from the group consisting of toluylene diisocyanate, dicyclohexylmethane diisocyanate, isophorone diisocyanate, trimethylhexane diisocyanate, cyclohexane diisocyanate, cyclohexanedimethylene diisocyanate and tetramethylenexylylene diisocyanate, wherein the mol % of the respective diisocyanates add up to 100 mol %, wherein 20 to 100 mol % of the diol component b) is formed by at least one linear aliphatic alpha,omega-C2-C12-diol, and 0 to 80 mol % by at least one diol that is different from linear aliphatic alpha,omega-C2-C12-diols, wherein each diol of the diol component preferably forms at least 10 mol % within the diol component, and wherein the mol % of the respective diols add up to 100 mol %.

50 to 80 mol % of the diisocyanate component is formed by 1,6-hexane diisocyanate and/or diphenylmethane diisocyanate, and 20 to 50 mol % by one or two diisocyanates selected from the group consisting of toluylene diisocyanate, dicyclohexylmethane diisocyanate, isophorone diisocyanate, trimethylhexane diisocyanate, cyclohexane diisocyanate, cyclohexanedimethylene diisocyanate and tetramethylenexylylene diisocyanate, wherein if two diisocyanates are selected, each diisocyanate forms at least 10 mol % of the diisocyanates of the diisocyanate component. Preferably, the diisocyanate or the two diisocyanates, forming in total 20 to 50 mol % of the diisocyanate component, are selected from dicyclohexylmethane diisocyanate, isophorone diisocyanate, trimethylhexane diisocyanate, cyclohexane diisocyanate, cyclohexanedimethylene diisocyanate and tetramethylenexylylene diisocyanate.

The diol component consists to an extent of 20 to 100 mol % of at least one linear aliphatic alpha,omega-C2-C12-diol and to an extent of 0 to 80 mol % of at least one diol differing from linear aliphatic alpha,omega-C2-C12-diols. The diol component preferably consists of no more than four different diols, in particular only of one to three diols. In the case of only one diol, it accordingly comprises a linear aliphatic alpha,omega-C2-C12-diol. In the case of a combination of two, three or four diols, the diol component consists to an extent of 20 to 100 mol %, preferably of 80 to 100 mol %, of at least one linear aliphatic alpha,omega-C2-C12-diol and to an extent of 0 to 80 mol %, preferably of 0 to 20 mol % of at least one diol differing from linear aliphatic alpha,omega-C2-C12-diols and preferably, also from alpha,omega-diols with more than 12 carbon atoms. The at least one diol differing from linear aliphatic alpha,omega-C2-C12-diols and preferably, also from alpha,omega-diols with more than 12 carbon atoms comprises in particular (cyclo)aliphatic diols defined by empirical and structural formula and with a low molar mass in the range of 76 to 600. The proportion of possible non-(cyclo)aliphatic diols preferably amounts to no more than 30 mol % of the diols of the diol component. In the case of a diol combination, each diol preferably makes up at least 10 mol % of the diol component.

Preferably, the diol component does not comprise any non-(cyclo)aliphatic diols. Most preferably, it does not comprise any diols that are different from linear aliphatic alpha,omega-C2-C12-diols, but rather consists of one to four, preferably, one to three, and in particular, only one linear aliphatic alpha, omega-C2-C12-diol.

In the case of the diol combination, the diol component may be introduced as a mixture of its constituent diols or the diols constituting the diol component may be introduced individually into the synthesis. It is also possible to introduce a proportion of the diols as a mixture and to introduce the remaining proportion(s) in the form of pure diol.

Equally, however, the diisocyanate component may also be divided into two or more portions or into the individual diisocyanates, for example, such that the hydroxyl components are initially reacted with part of the diisocyanate component and finally with the remaining proportion of the diisocyanate component.

Examples of linear aliphatic alpha,omega-C2-C12-diols that may be used as one single diol or as constituent of the diol component are ethylene glycol, 1,3-propanediol, 1,4-butanediol, 1,5-pentanediol, 1,6-hexanediol, 1,10-decanediol and 1,12-dodecanediol.

Examples of diols that are different from linear aliphatic alpha,omega-C2-C12-diols and may be used in the diol component are telechelic(meth)acrylic polymer diols, polyester diols, polyether diols, polycarbonate diols, each with a number-average molar mass of, for example, up to 800 as representatives of oligomeric or polymeric diols, bisphenol A as a representative of low molar mass non-(cyclo)aliphatic diols defined by empirical and structural formula and those isomers of propanediol and butanediol that are different from the isomers of propanediol and butanediol specified in the preceding paragraph, as well as, neopentyl glycol, butyl ethyl propanediol, the isomeric cyclohexanediols, the isomeric cyclohexanedimethanols, hydrogenated bisphenol A, tricyclodecanedimethanol, and dimer fatty alcohol as representatives of (cyclo)aliphatic diols defined by empirical and structural formula with a low molar mass in the range of 76 to 600.

The diisocyanates of the diisocyanate component, the diol component and the tertiary amine are preferably reacted together in the absence of solvents. They may be reacted in analogy to the preparation according to the first preferred embodiment described above.

In a third preferred embodiment, the catalyst compounds C) are compounds which can be prepared by reacting a trimer of a (cyclo)aliphatic diisocyanate, 1,6-hexanediisocyanate and/or diphenylmethane diisocyanate, potentially a diol component and a tertiary amine wherein the potentially diol component is one single linear aliphatic alpha,omega C2-C12 diol or a combination of two to four, preferably, two or three, (cyclo)aliphatic diols, wherein in the case of diol combination, each of the diols makes up at least 10 mol % of the diols of the diol combination and the diol combination consists of at least 80 mol % of at least one linear aliphatic alpha,omega C2-C12 diol.

The trimer of the (cyclo)aliphatic diisocyanate is a polyisocyanate of the isocyanurate type, prepared by trimerization of a (cyclo)aliphatic diisocyanate. Appropriate trimerization products derived, for example, from 1,4-cyclohexanedimethylenediisocyanate, in particular, from isophorondiisocyanate and more particularly, from 1,6-hexanediisocyanate, are suitable. The industrially obtainable isocyanurate polyisocyanates generally contain, in addition to the pure trimer, i.e., the isocyanurate made up of three diisocyanate molecules and comprising three NCO functions, isocyanate-functional secondary products with a relatively high molar mass. Products with the highest possible degree of purity are preferably used. In each case, the trimers of the (cyclo)aliphatic diisocyanates obtainable in industrial quality are regarded as pure trimer irrespective of their content of said isocyanate-functional secondary products with respect to the molar ratio of 1 mol trimer of the (cyclo)aliphatic diisocyanate:x mol 1,6-hexanediisocyanate:x mol diol.

One single linear aliphatic alpha,omega C2-C12 diol or combinations of two to four, preferably of two or three, (cyclo)aliphatic diols are used as the diol component. The diol combination preferably consists of two to four, in particular two or three, linear aliphatic alpha,omega C2-C12 diols.

Examples of one single linear aliphatic alpha,omega C2-C12 diol or linear aliphatic alpha,omega C2-C12 diols which can be used within the diol combination are ethylene glycol, 1,3-propanediol, 1,4-butanediol, 1,5-pentanediol, 1,6-hexanediol, 1,10-decanediol, 1,12-dodecanediol.

Examples of (cyclo)aliphatic diols which can be used within the diol combination in addition to the at least one linear aliphatic alpha,omega C2-C12 diol making up at least 80 mol % of the diol combination are the further isomers of propane and butane diol, different from the isomers of propane and butane diol cited in the preceding paragraph, and neopentylglycol, butylethylpropanediol, the isomeric cyclohexane diols, the isomeric cyclohexanedimethanols, hydrogenated bisphenol A and tricyclodecanedimethanol.

In the case of the diol combination, the mixture of the diols making up the combination can be used in the synthesis process or the diols making up the diol combination are each used individually in the synthesis. It is also possible to use a portion of the diols as a mixture and the remaining fraction(s) in the form of pure diol.

In the case of the diol combination, preferred diol combinations totalling 100 mol % in each case are combinations of 10 to 90 mol % 1,3-propanediol with 90 to 10 mol % 1,5-pentanediol, 10 to 90 mol % 1,3-propanediol with 90 to 10 mol % 1,6-hexanediol and 10 to 90 mol % 1,5-pentanediol with 90 to 10 mol % 1,6-hexanediol.

The trimer of the (cyclo)aliphatic diisocyanate, 1,6-hexane-diisocyanate and/or diphenylmethane diisocyanate, the diol component and the tertiary amine are preferably reacted together in the absence of solvents. The reactants may here be reacted in analogy to the preparation according to the first preferred embodiment described above.

When the synthesis is performed in multiple stages, the reactants may be added in the most varied order, for example, also in succession or in alternating manner. For example, 1,6-hexanediisocyanate may be reacted initially with the diol component and then with the trimer of the (cyclo)aliphatic diisocyanate or a mixture of the isocyanate-functional components with the diol component and subsequently with the tertiary amine. In the case of a diol combination, the diol component may, for example, also be divided into two or more portions, for example, also into the individual (cyclo) aliphatic diols. The individual reactants may in each case be added in their entirety or in two or more portions. The reaction is exothermic and proceeds at a temperature above the melting temperature of the reaction mixture. The reaction temperature is, for example, 60 to 200° C. The rate of addition or quantity of reactants added is accordingly determined on the basis of the degree of exothermy and the liquid (molten)

reaction mixture may be maintained within the desired temperature range by heating or cooling.

Preferred tertiary amines c) that can be used in the first, second and third preferred embodiment are N,N-dialkylalkanolamines, N,N-dialkyldialkanolamines and N-alkyldialkanolamines. Examples of those amines are N,N-dimethylalkanolamines, such as N,N-dimethylethanolamine, N,N-dimethylaminopropanol and N,N-dimethylmethanolamine, N,N-dimethyldialkanolamines, such as N,N-dimethyldiethanolamine, N,N-dimethyldimethanolamine as well as N-alkyldiethanolamines, such N-methyldiethanolamine.

The catalyst compounds C) may be produced in the presence of one or more organic solvents which are not reactive towards polyisocyantes. After synthesis other solvents or resins can be added. After cooling below the melting point the catalyst compound solidifies and can be filtered off or can be used as suspension. It is also possible to prepare the catalyst compounds C) without solvent and to use it as a fine powder or suspension in suitable solvent or resin.

The catalyst compounds C) assume the form of a mixture exhibiting a molar mass distribution. The catalyst compounds C) do not, however, require working up and may be used directly as catalyst.

The at least one catalyst compound C) is present in particulate form, in particular in the form of particles with a non-spherical shape, in the coating compositions. The average particle size (mean particle diameter) of the catalyst compound C) particles determined by means of laser diffraction is, for example, 1 to 100 μm. The catalyst compound C) particles may be formed by grinding (milling) of the catalyst compound C). For example, conventional powder coat production technology may be used for that purpose. The catalyst compound C) particles may either be stirred or mixed as a ground powder into the per se liquid coating composition or liquid constituents thereof, wherein it is possible subsequently to perform additional wet grinding or dispersing of the catalyst compounds C) particles, for example, by means of a bead mill, in the resultant suspension.

A further method for forming catalyst compounds C) particles involves hot dissolution of the at least one catalyst compound C) in an organic solvent (mixture) and subsequent catalyst compound C) particle formation during and/or after cooling, in particular, dissolving the at least one catalyst compounds C) in a proportion or the entirety of the solvent (mixture) with heating to the melting temperature or above, for example, to temperatures of 40 to above 180° C., whereupon the catalyst compounds C) particles may be formed during and/or after the subsequent cooling. Thorough mixing or stirring is preferably performed during cooling. By using the method of hot dissolution and subsequent catalyst compound C) particle formation during and/or after cooling, it is in particular possible to produce catalyst compound C) particles with average particle sizes at the lower end of the range of average particle sizes, for example, in the range of 1 to 50 μm, in particular 1 to 30 μm.

As already stated, the coating compositions according to the invention contain at least one compound A) with groups reactive with the functional groups of the at least one cross-linking agent, for example, groups containing active hydrogen. The compounds A), e.g. binder(s) A) are not solid at room temperature but are, for example, liquid, and/or are soluble in an organic solvent (mixture) and/or water-reducible. Binders A) soluble in an organic solvent (mixture) are present in dissolved form in the coating compositions containing organic solvent(s).

The molar ratio of groups reactive towards functional groups of the cross-linking agent, in particular the hydroxyl or thiol groups from the at least one compound A) to the to the functional groups of the cross-linking agent, in particular to the isocyanate groups from the at least one polyisocyante cross-linking agent B), are for example, 0.5:1 to 3:1, in particular 0.7:1 to 2:1.

The coating compositions according to the invention may contain in addition one or more compounds or binders D) which contribute towards the resin solids content. Examples of additional binders are physically drying resins or resins which may be chemically cured by reactions other than the addition of groups reactive with isocyanate groups, such as, in particular, hydroxyl groups, onto isocyanate groups.

One, some or each of components A, B and D may contain free-radically polymerizable olefinic double bonds. The coating compositions according to the invention may then be cured not only by the reaction of the functional groups of component A) with the functional groups of the cross-linking agent B) but additionally by free-radical polymerization of the olefinic double bonds, in particular, by photochemically induced free-radical polymerization. Such compositions are also known as "dual-cure" coating compositions.

The coating compositions according to the invention have a solids content of, for example, 40 to 85 wt. %, preferably 45 to 75 wt. %.

The coating compositions, according to the invention, contain furthermore water and/or organic solvents. Water-based coating compositions contain, for example, 30-60% by weight of water, and possibly small amounts of organic solvents, e.g., up to 15% by weight, preferably, up to 10% by weight based on the entire coating composition.

The organic solvents are solvents conventionally used in coating techniques. These may originate from the preparation of the binders or are added separately. Examples of suitable solvents are monohydric or polyhydric alcohols, e.g., propanol, butanol, hexanol; glycol ethers or esters, for example, diethylene glycol dialkyl ether, dipropylene glycol dialkyl ether, each with C1- to C6-alkyl, ethoxypropanol, butyl glycol; glycols, for example, ethylene glycol, propylene glycol, N-methyl pyrrolidone and ketones, e.g., methyl ethyl ketone, acetone, cyclohexanone; aromatic or aliphatic hydrocarbons, for example, toluene, xylene, or straight-chain or branched aliphatic C6-C12-hydrocarbons.

The coating compositions, according to the invention, can contain pigments, fillers and/or usual coating additives. All colour and/or special effect-giving pigments of organic or inorganic type used in paints are suitable for pigments. Examples of inorganic or organic colour pigments are titanium dioxide, micronized titanium dioxide, iron oxide pigments, carbon black, azo pigments, phthalocyanine pigments, quinacridone or pyrrolopyrrole pigments. Examples of special effect pigments are metal pigments, for example, from aluminum or copper, interference pigments, such as, for example, aluminum coated with titanium dioxide, coated mica, graphite effect pigments and iron oxide laminae. Examples of fillers are silicon dioxide, barium sulfate, talcum, aluminum silicate and magnesium silicate.

The additives are additives usually used in the paint industry. Examples of such additives are light stabilizers, for example, based on benztriazoles and HALS (hindered amine light stabilizer) compounds, flow control agents based on (meth)acrylic homopolymers or silicon oils, rheology-influencing agents, such as, highly disperse silicic acid or polymeric urea compounds, thickeners, such as, cross-linked polycarboxylic acid or polyurethanes, anti-foaming agents, wetting agents, photoinitiators. The additives are added in the usual amounts familiar to the person skilled in the art.

Additional curing accelerators for the cross-linking reaction, for example, organic metallic salts, such as, dibutyl tin dilaurate, zinc naphthenate, can be used in small amounts, of e.g. up to 0.5% by weight based on the total coating composition.

The long pot life of the coating compositions according to the invention is particularly advantageous. Conventional coating compositions based on hydroxyl-functional an/or thiol-functional binders and free polyisocyanate crosslinking agents are in fact distinguished by only limited pot life if no specific measures have been taken. Generally a rapid reaction occurs between the hydroxyl-functional and/or thiol-functional binder and the polyisocyanate cross-linking agent when mixed with one another, in particular when a curing catalyst is present. This is perceptible, for example, from an increase in the viscosity of the coating composition. The pot life is substantially long in case of the coating compositions according to the invention due to the presence of the latent catalyst compound C). The pot life after mixing (when A and B and C are brought into contact) amounts, for example, to up to 20 hours.

The coating compositions may be used for the production of single-layer coatings or for the production of one or more coating layers within a multilayer coating, such as, in particular, an automotive multilayer coating, either on an automotive body or on an automotive body part. This may relate to both original and repair coating applications. The coating compositions may in particular be used in pigmented form for the production of a primer surfacer layer or a single stage top coat layer or in pigment-free form for the production of an outer clear top coat layer or a transparent sealing layer of a multilayer coating. They may, for example, be used for the production of a clear top coat layer on a previously applied color-imparting and/or special effect-imparting pre-dried base coat layer.

The coating compositions may be applied by means of conventional application methods, in particular, by spraying onto any desired uncoated or precoated substrates, for example, of metal or plastics. Once applied, layers of the coating compositions according to the invention may initially be flashed off to remove solvent, for example. Thermal curing then proceeds at object temperatures above the melting temperature of the catalyst compounds C) contained in the corresponding coating composition, for example, for 5 to 30 minutes at 40 to 220° C., for example, by baking or irradiating with IR radiation (IR=Infra Red). Radiating with IR radiation can be carried out with usual IR dryers, for example for 3 to 6 minutes at a distance IR dryer/object surface of 50-80 cm. During and/or after melting the catalyst compound C) particles may become active to catalyse the curing reaction. They may additionally be incorporated into the binder/cross-linking agent matrix in case of functional, e.g. hydroxyl functional catalyst compounds C).

If the coating compositions according to the invention are dual-cure coating compositions, thermal curing is combined with curing by free-radical polymerization of olefinic double bonds induced by irradiation with high-energy radiation, in particular UV radiation. Thermal curing and radiation curing may here proceed simultaneously or in any desired order. Melting of the catalyst compound C) particles must, however, be ensured prior to curing.

Besides an improved pot life the coating compositions according to the invention have excellent early polishing properties and early tack-free time.

The following examples are intended to illustrate the invention in greater detail. All parts and percentages are on a weight basis unless otherwise indicated.

EXAMPLES

Examples 1a to 1j

Preparation of Catalyst Compounds C

Catalyst compounds C) were produced by reacting HDI (1,6-hexane diisocyanate) with one or more diols, optionally a monoalcohol and with N-methyldiethanolamine (MDEA) or N,N-dimethylethanolamine (DMEA) in accordance with the following general synthesis method:

The one or more diols and the optional monoalcohol were pre-charged into a four neck glass reactor equipped with a thermocouple, a stirrer and a dropping funnel. The MDEA or DMEA was added and the reaction mixture was heated to 70° C. HDI was added dropwise in such a way that 120° C. are not exceeded. At 120-130° C. the reaction mixture has been kept until the theoretical free isocyanate content was reached. The hot melt was discharged and allowed to cool and solidify.

The melting behaviour of the resultant catalyst compounds C) was investigated by means of DSC (differential scanning calorimetry, heating rate 10 K/min), wherein the melting temperature of the at least one catalyst compound C) was the upper end of the melting range.

In Tables 1a and 1b Examples 1a to 1j are shown. The Tables state which reactants were reacted together in what molar ratios and the final temperature of the melting process measured by DSC is stated in ° C.

TABLE 1a

| Example | Mols HDI | Mols 1,3-propandiol | Mols 1,2-propandiol | Mols Cyclo-hexanol | Mols DMEA | Mols MDEA |
|---|---|---|---|---|---|---|
| 1a | 3 | 2 | | | 2 | |
| 1b | 3 | 1.5 | 0.5 | | 2 | |
| 1c | 3 | 1 | | 2 | | 1 |
| 1d | 3 | 2 | | 1 | | 1 |
| 1e | 3 | 1.8 | 0.2 | 1 | | 1 |
| 1f | 3 | 1.5 | 0.5 | 1 | | 1 |
| 1g | 3 | 2.5 | 0.5 | | | 1 |
| 1h | 3 | 2 | 1 | | | 1 |
| 1i | 3 | 1.5 | 1.5 | | | 1 |
| 1j | 2.5 | 2.5 | 0.5 | | | 0.5 |

TABLE 1b

| Example | Amine value* (calc) | Final temperature of the melting process in ° C. | Hydroxyl value* (calc) |
|---|---|---|---|
| 1a | 135 | 129 | — |
| 1b | 135 | 115 | — |
| 1c | 62 | 98 | — |
| 1d | 64 | 132 | 64 |
| 1e | 64 | 129 | 64 |
| 1f | 64 | 124 | 64 |
| 1g | 66 | 133 | 132 |
| 1h | 66 | 137 | 132 |
| 1i | 66 | 105 | 132 |
| 1j | 40 | 134 | 158 |

*mg KOH/g resin solid

Example 3

Production of Clear Coat Compositions

The catalytic effect of the catalysts and the potlife were tested in clear coat compositions. The catalysts 1b, 1c and 1i were each added as fine powders to the clear coat composition.

For comparison a clear coat composition with equivalent amounts of DMEA, a clear coat composition with equivalent amounts of MDEA and a clear coat composition without a catalyst have been formulated.

Clear Coat Compositions According to the Invention:

CC1: with catalyst 1b; CC2: with catalyst 1c; CC3 with catalyst 1i

Comparative Clear Coat Compositions:

CC4: with MDEA; CC5: with DMEA; CC6: without catalyst

The initial flow time (viscosity) according to DIN EN ISO 2431 with a DIN 4 cup at 20° C. was determined directly after mixing with the polyisocyanate hardener (Desmodur HDB/75). The pot life of the clear coats has been determined in terms of the time period for doubling the initial flow time (viscosity)

The clear coat compositions and comparative clear coat compositions were applied over red basecoats (Cromax Pro Rouge Vif/075 from DuPont; dry film thickness of 25 μm) in a resulting dry film thickness of 50 μm. After a final flash-off phase of approx. 10 minutes at room temperature, the clear coats were hardened with IR radiation for five minutes (IR dryer: IRT 400 of Hedson Technologies A.B, distance IR dryer/object surface: 50 cm, maximum object temperature: 120° C.)

In Table 2 clear coat compositions CC1 to CC6 are shown. The Table states which ingredients were used in formulating the clear coat compositions. All data in Table 2 are parts by weight.

Table 3 shows the pot life (time period for doubling the initial flow time/viscosity after) and the pendulum hardness (König) directly after IR drying and after 2 days altering.

TABLE 2

| Ingredient | CC4 | CC5 | CC6 | CC1 | CC2 | CC3 |
|---|---|---|---|---|---|---|
| Worleepol 1181/09[1)] | 33.05 | 33.05 | 33.05 | 33.05 | 33.05 | 33.05 |
| PETMP[2)] | 13.40 | 13.40 | 13.40 | 13.40 | 13.40 | 13.40 |
| DBTL[6)] | 0.01 | 0.01 | 0.01 | 0.01 | 0.01 | 0.01 |
| MDEA[3)] | 0.15 | | | | | |
| DMEA[4)] | | 0.11 | | | | |
| Catalyst 1b | | | | 0.52 | | |
| Catalyst lc | | | | | 1.13 | |
| Catalyst 1i | | | | | | 1.07 |
| Butylacetate | 20.00 | 20 | 20 | 20 | 20 | 20 |
| Desmodur HDB/75[5)] | 53.40 | 53.4 | 53.4 | 53.4 | 53.4 | 53.4 |
| Pot life | Immediate gel particle formation | Immediate gel particle formation | 37 h | 20 h | 18.5 h | 23 h |
| Pendulum Hardness after 2 min IR drying | Not possible to apply coating | Not possible to apply coating | sticky | 40 | 48 | 39 |
| Pendulum hardness after 2d altering | — | — | 20 | 80 | 83 | 79 |

TABLE 3

IR = Infra red
Hardness Measurement: according to standard for König pendulum hardness measurement
1) Worleepol 1181/09 = OH-functional saturated polyester resin from Worlee
2) PETMP = Pentaerythrit tetra-3-mercaptopropionate TABLE 3-continued 3) MDEA = N-Methyl-diethanolamine
4) DMEA = N,N-Dimethylethanolamin
5) Desmodur HDB/75 = Biuret of hexamethylen diisocyanate from Bayer The data shown in Table 3 clearly show that the clear coat compositions according to the invention (CC1, CC2, CC3) have sufficient long potlife and acceptable initial hardness after IR drying as well as acceptable hardness after IR drying and additional altering of two days. The comparative clear coat compositions CC4 and CC5 containing free amine catalysts show immediate gel particle formation after mixing with the curing agent and can not be applied. The comparative clear coat composition CC6 containing no catalyst shows acceptable potlife, but sticky surface after IR curing and still insufficient hardness after 2 days altering.

What is claimed is:

1. Two-component liquid coating composition comprising:

A) at least one compound with functional groups reactive towards reactive functional groups of cross-linking agent B), B) at least one cross-linking agent with reactive functional groups and C) at least one catalyst compound having at least one urethane and/or at least one urea group and at least one tertiary amine group, said catalyst compound is present as particles having a melting temperature of 40 to 180° C., wherein said catalyst compound is prepared by reacting a) at least one polyisocyanate with b) at least one polyol and/or with c) at least one tertiary amine compound having at least one group capable of addition with isocyanate, wherein the at least one catalyst compound C) is present as particles and wherein the particles have an average particle size, as determined by means of laser diffraction, of 1 to 100 μm.

2. The coating composition of claim 1, wherein the at least one catalyst compound C) has a melting temperature of 60 to 160° C.

3. The coating composition of claim 1, wherein the solubility of the at least one catalyst compound C) is less than 10 g per liter of butyl acetate at 20° C.

4. The coating composition of claim 1, wherein the catalyst compound C) is a solid catalyst compound and the particles of the solid catalyst compound are formed by grinding of the at least one solid catalyst compound C) or by hot dissolution of the at least one catalyst compound C) in a dissolution medium and subsequent catalyst compound C) particle formation during and/or after cooling.

5. The coating composition of claim 1, wherein said polyol is a diol.

6. The coating composition of claim 1, wherein the polyisocyanate a) comprises at least one polyisocyanate selected from a group consisting of 1,6-hexane diisocyanate, diphenylmethane diisocyanate, the isocyanurate of 1,6-hexane diisocyanate, the isocyanurate of diphenylmethane diisocyanate and combinations thereof.

7. The coating composition of claim 1, wherein the at least one polyol is a diol and wherein the diol b) is a diol component that is formed by at least one linear aliphatic alpha,omega-C2-C12-diol, and 0 to 80 mol % by at least one diol that is different from linear aliphatic alpha,omega-C2-C12-diols, wherein the mol % of the respective diols add up to 100 mol %.

8. The coating composition of claim 1, wherein the tertiary amine compound c) is an amine compound selected from the group consisting of hydroxyl amine, thiol amine, diamine with a secondary or primary amino group, polyamine with at least two primary amino groups and/or with at least two secondary amino groups, and combinations thereof.

9. The coating composition of claim 1, wherein the at least one catalyst compound C) is a compound which is prepared by reacting a) at least one diisocyanate, with b) at least one diol component and with c) at least one tertiary amine compound c) having at least one group capable of addition with isocyanate, wherein the diisocyanate component is formed by 1,6-hexane diisocyanate and/or diphenylmethane diisocyanate, and 20 to 50 mol % by one or two diisocyanates, each forming at least 10 mol % of the diisocyanate component and being selected from the group consisting of toluylene diisocyanate, dicyclohexylmethane diisocyanate, isophorone diisocyanate, trimethylhexane diisocyanate, cyclohexane diisocyanate, cyclohexanedimethylene diisocyanate and tetramethylenexylylene diisocyanate, wherein the mol % of the respective diisocyanates add up to 100 mol %, wherein 20 to 100 mol % of the diol component is formed by at least one linear aliphatic alpha,omega-C2-C12-diol, and 0 to 80 mol % by at least one diol that is different from linear aliphatic alpha,omega-C2-C12-diols, wherein the mol % of the respective diols add up to 100 mol %.

10. The coating composition of claim 1, wherein the catalyst compound C) is present in an amount of 2 to 10% by weight, relative to the entire coating composition.

11. The coating composition of claim 1, wherein the compound A) comprises compounds selected from the group consisting of hydroxyl-functional, thiol-functional, epoxy-functional, silane-functional compounds and combinations thereof.

12. The coating composition of claim 1, wherein the cross-linking agent B) comprises polyisocyanates with free isocyanate groups and/or carboxyl groups.

13. The coating composition of claim 1, wherein the compound A) comprises compounds with hydroxyl groups and/or thiol groups and cross-linking agent B) comprises polyisocyanates with free isocyanate groups.

14. A process for the preparation of a coating layer, comprising the successive steps:

1) applying a coating layer from a coating composition of claim 1 onto uncoated or precoated substrate,
2) optionally, flashing off the applied coating layer to remove organic solvent and/or water, and
3) thermally curing the coating layer at an object temperature above the melting temperature of the at least one said catalyst compound C).

15. The process of claim 14, wherein the coating layer is selected from the group consisting of a primer layer, a surfacer layer, an outer clear top coat layer, a pigmented single-stage top coat layer and a transparent sealing layer.

16. The process of claim 14, wherein the coatings layer is industrial coating, original automotive coating or automotive repair coating of automotive bodies and automotive body parts.

* * * * *